US007765043B2

(12) United States Patent
Kobayashi

(10) Patent No.: US 7,765,043 B2
(45) Date of Patent: Jul. 27, 2010

(54) POWER SUPPLY CONTROL APPARATUS AND METHOD

(75) Inventor: Toshikazu Kobayashi, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1804 days.

(21) Appl. No.: 10/819,986

(22) Filed: Apr. 8, 2004

(65) Prior Publication Data

US 2004/0230357 A1 Nov. 18, 2004

(30) Foreign Application Priority Data

May 12, 2003 (JP) ............................ 2003-133493

(51) Int. Cl.
*G06F 7/00* (2006.01)

(52) U.S. Cl. .............................. 701/36; 701/1; 701/29; 701/33; 701/35; 701/48; 180/65.1; 180/65.235; 340/5.1; 340/438; 340/459; 340/988; 340/989

(58) Field of Classification Search .................. 701/36, 701/1
See application file for complete search history.

(56) References Cited

U.S. PATENT DOCUMENTS 4,497,057 A * 1/1985 Kato et al. .................... 714/46
4,667,176 A * 5/1987 Matsuda ..................... 340/459
5,739,761 A * 4/1998 Kobayashi ................... 701/35
6,138,059 A * 10/2000 Ozeki et al. .................... 701/1
6,144,903 A * 11/2000 Tousignant .................. 701/29
6,404,163 B1 * 6/2002 Kapsokavathis et al. .... 320/104
6,406,806 B1 * 6/2002 Keskula et al. ................ 429/13
6,691,523 B1 * 2/2004 Sangwan et al. .............. 62/133
6,703,946 B2 * 3/2004 Flick .......................... 340/989
6,757,599 B2 * 6/2004 Nada .......................... 701/29
6,952,156 B2 * 10/2005 Arshad et al. ................ 340/5.6
2002/0084786 A1 7/2002 Egami
2002/0128759 A1 * 9/2002 Sodoski et al. ................ 701/36
2003/0158639 A1 * 8/2003 Nada .......................... 701/29
2003/0200016 A1 * 10/2003 Spillane et al. ............... 701/36
2003/0200017 A1 * 10/2003 Capps et al. .................. 701/36
2004/0024502 A1 * 2/2004 Squires et al. ................ 701/33
2005/0067900 A1 * 3/2005 Bailey ......................... 307/45
2009/0293521 A1 * 12/2009 Major et al. ............... 62/228.1

FOREIGN PATENT DOCUMENTS

DE 197 10 363 A1 9/1998

(Continued)

*Primary Examiner*—Khoi Tran
*Assistant Examiner*—Jonathan Sample
(74) *Attorney, Agent, or Firm*—Oliff & Berridge, PLC

(57) ABSTRACT

When first and second ignition switches are turned from on to off, a first or second CPU determines whether an abnormality has occurred in an electronically controlled brake system. When the first or second CPU determines that an abnormality has occurred, the first and second CPUs immediately turn off first and second main relays, respectively. When both the first and second CPUs determine that operation is normal and an occupant detection switch is off, the first and second CPUs keep the first and second main relays on for a predetermined period of time as a self-maintaining process during normal operation. In this self-maintaining process during normal operation, the period during which the first and second main relays are kept on is changed according to the voltage of a vehicle battery.

13 Claims, 8 Drawing Sheets

FOREIGN PATENT DOCUMENTS

| | | | |
|---|---|---|---|
| DE | 198 28 057 | A1 | 12/1999 |
| JP | A-61-229639 | | 10/1986 |
| JP | A-62-122827 | | 6/1987 |
| JP | A-63-284052 | | 11/1988 |
| JP | Y2 5-32374 | | 5/1989 |
| JP | A-04-024112 | | 1/1992 |
| JP | A 6-127317 | | 5/1994 |
| JP | A-08-163711 | | 6/1996 |
| JP | A 2001-328518 | | 11/2001 |

* cited by examiner

FIG. 7

| LOCATION WHERE ABNORMALITY OCCURRED | PUMP MOTOR | PRESSURE INCREASE VALVE | PRESSURE DECREASE VALVE | ECU | PRESSURE SENSOR | STROKE SENSOR |
|---|---|---|---|---|---|---|
| ABNORMALITY LEVEL | 1 | 1 | 1 | 2 | 3 | 3 |

FIG. 8

| SYSTEM IN WHICH ABNORMALITY OCCURRED | ELECTRONICALLY CONTROLLED BRAKE SYSTEM | ELECTRONICALLY CONTROLLED POWER STEERING SYSTEM | ELECTRONICALLY CONTROLLED PARKING BRAKE SYSTEM |
|---|---|---|---|
| ABNORMALITY LEVEL | 1 | 2 | 3 |

POWER SUPPLY CONTROL APPARATUS AND METHOD

INCORPORATION BY REFERENCE

The disclosure of Japanese Patent Application No. 2003-133493 filed on May 12, 2003, including the specification, drawings and abstract is incorporated herein by reference in its entirety.

BACKGROUND OF THE INVENTION

1. Field of the Invention

The invention relates to a control apparatus and method for a power supply mounted in a vehicle. More specifically, this invention relates to technology for supplying power for a fixed period when vehicle starting means is switched from on to off.

2. Description of the Related Art

Steering apparatuses, braking apparatuses, and shifting apparatuses, are all examples of apparatuses which control the behavior of a vehicle. When these apparatuses are electronically controlled apparatuses that are controlled electrically, they are generally connected, via an ignition switch which serves as vehicle starting means, to a power supply for the vehicle, from which they receive power. Therefore, when the ignition switch is turned from on to off, the power supplied to those electronically controlled apparatuses also turns off. Technology is known, such as that disclosed in Japanese Utility Model Publication No. JP-U-5-32374, which relates to a self-maintaining function that supplies power to these kinds of electronically controlled apparatuses for a fixed period of time after the ignition switch is turned off.

The technology disclosed in the aforementioned publication provides a switch which interrupts the supply of power to an electronic control unit that controls the electronically controlled apparatuses, thereby reducing the amount of power from the power supply that is consumed.

With the technology in that publication, however, only simple two-way control of either supplying power or interrupting the supply of power is achieved; fine control according to the state of the vehicle is not possible.

SUMMARY OF THE INVENTION

An invention of the present invention provides a power supply control technology which enables power to be supplied according to the state of the vehicle when a vehicle starting apparatus is switched from on to off.

A first aspect of the invention relates to a power supply control apparatus that includes a power supply which supplies power to a system of the vehicle, and a vehicle starting apparatus disposed between the power supply and the system of the vehicle, which is switched from one state to another during startup of the vehicle. This power supply control apparatus supplies power to the system of the vehicle when the vehicle starting apparatus is switched from on to off. This power supply control apparatus also includes an abnormality detecting portion which detects an abnormality in the vehicle, and a controller that controls, based on a detection result from the abnormality detecting portion, an amount of power supplied from the power supply over a predetermined period of time when the vehicle starting apparatus is switched from on to off.

The term "a predetermined period of time" of the invention includes the term "a period of time until a predetermined condition is fulfilled".

According to this structure, when an abnormality occurs in the vehicle, it is possible to stop or reduce the supply of power from the power supply by the vehicle starting apparatus being turned from on to off. As a result, the system in which the abnormality has occurred is prevented from being used, which in turn inhibits the vehicle abnormality from becoming more severe as well as inhibits the abnormality from affecting other related systems.

A second aspect of the invention relates to a power supply control apparatus that includes a power supply which supplies power to a system of the vehicle, and a vehicle starting apparatus disposed between the power supply and the system of the vehicle, which is switch from one state to another during startup of the vehicle. This power supply control apparatus supplies power to the system of the vehicle when the vehicle starting apparatus is turned from on to off. This power supply control apparatus also includes a controller that detects a power supply capability of the power supply, and controls, according to the detected power supply capacity, an amount of power continuing to be supplied from the power supply to the system of the vehicle when the vehicle starting apparatus is turned from on to off.

A third aspect of the invention relates to a power supply control method for supplying power to a system of a vehicle for a predetermined period of time, when a vehicle starting apparatus which is switched from one state to another during startup of the vehicle, is switched from on to off. This method includes a step of detecting an abnormality in the vehicle; and a step of controlling, based on whether the abnormality has been detected, an amount of power supplied from the power supply over the predetermined period of time when the vehicle starting apparatus is switched from on to off.

A fourth aspect of the invention relates to a power supply control method for supplying power to a system of a vehicle for a predetermined period of time, when a vehicle starting apparatus which is switched from one state to another during startup of the vehicle, is switched from on to off. This method includes a step of detecting a power supply capability of the power supply; and a step of controlling, according to the detected power supply capability, an amount of power continuing to be supplied from the power supply to the system of the vehicle when the vehicle starting apparatus is switched from on to off.

BRIEF DESCRIPTION OF THE DRAWINGS

The foregoing and further objects, features, and advantages of the invention will become apparent from the following description of preferred embodiments with reference to the accompanying drawings, wherein like numerals are used to represent like elements and wherein:

FIG. 7 is an abnormality level/location table showing the level of abnormality corresponding to the location of the abnormality; and FIG. 8 is an abnormality level/location table showing the level of abnormality corresponding to the system in which the abnormality occurred.

DETAILED DESCRIPTION OF THE PREFERRED EMBODIMENTS

According to one exemplary embodiment of the invention, a self-maintaining function that supplies power for a fixed period of time when an ignition switch of a vehicle is turned off controls the period during which power is supplied according to whether an abnormality has occurred in the vehicle, or according to the voltage of a battery for the vehicle. In this specification, "an abnormality in the vehicle" refers to an abnormality relating to an actuator to which power is supplied from the battery according to the self-maintaining function when the ignition switch is turned from on to off. The actuator may be, for example, an electronically controlled brake system, an electronically controlled power steering system, or an electronically controlled parking brake system, or the like. The self-maintaining function indicated in this exemplary embodiment can be applied to an abnormality of a general electrical system to which power is supplied, and is not limited to an abnormality of the actuator as the abnormality in the vehicle.

Figure 1:
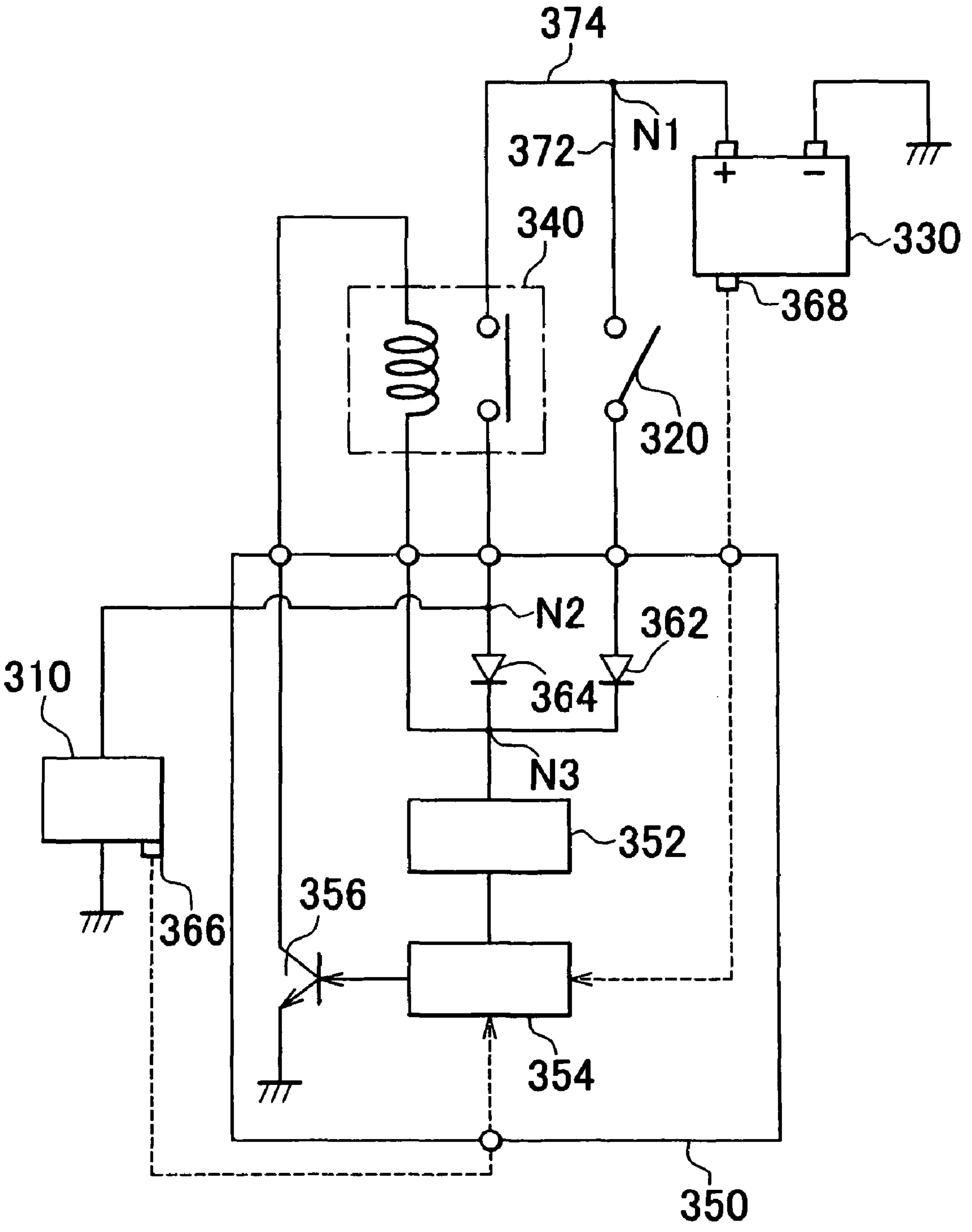
FIG. 1 is a block diagram of a control apparatus, a main relay, a battery for a vehicle, and an actuator, which together serve as a power supply control apparatus according to one exemplary embodiment of the invention.

FIG. 1 shows the configuration of a control apparatus 350, a main relay 340, a vehicle battery 330, an actuator 310, and an ignition switch 320, which together function as a power supply control apparatus according to this exemplary embodiment.

A wire leading from the vehicle battery 330 is connected to the control apparatus 350 after branching at a first branch point N1 into two systems, one being a first power supply wire 372 in which is provided the ignition switch 320 and the other being a second power supply wire 374 in which is provided the main relay 340. The first power supply wire 372 and second power supply wire 374, which are both connected to the control apparatus 350, are routed through first and second diodes 362 and 364, respectively, and then joined together again at a third branch point N3. The first and second diodes 362 and 364 allow the current only to flow in the direction from up to down in the drawing. The power supplied to the control apparatus 350 is regulated to a desired voltage by a power supply circuit 352 inside the control apparatus 350 and then supplied to a computing device (hereinafter simply referred to as "CPU") 354.

The main relay 340 is operatively linked to the ignition switch 320 and is turned on and off by the CPU 354. More specifically, the CPU 354 outputs a command signal to a gate electrode of a transistor 356 so as to energize or de-energize a coil in the main relay 340. As a result, the main relay 340, which is connected to the CPU 354, is turned either on or off, thereby either supplying, or stopping the supply of, power to the actuator 310.

On the second power supply wire 374 between the main relay 340 and the second diode 364 there is a second branch point N2 from which a wire branches and leads to the actuator 310. That is, power is supplied from the vehicle battery 330 to the actuator 310 through the main relay 340. The actuator 310 is, in this exemplary embodiment, an electronically controlled brake system, electronically controlled power steering system, or electronically controlled parking brake system, or the like. This actuator 310 is provided with an actuator sensor 366 that detects the state of the actuator 310 and outputs the detection results to the CPU 354. The CPU 354 then controls the supply of power to the actuator 310 according to the detection results from the actuator sensor 366. The vehicle battery 330 is provided with a voltage sensor 368 that detects the voltage of the vehicle battery 330 and outputs the detection results to the CPU 354. These results are then reflected in the amount of power supplied.

When the ignition switch 320 is turned off, the control apparatus 350 realizes a self-maintaining function with the main relay 340 such that the actuator 310 is actuated for a fixed period of time. When the self-maintaining function is active, the control apparatus 350 also controls the period during which the self-maintaining function is active according to the detection results from the voltage sensor 368. Further, when an abnormality occurs in the actuator 310, the control apparatus 350 inactivates the self-maintaining function and immediately stops the supply of power to the actuator 310 when the ignition switch 320 is turned off. When the actuator 310 includes a plurality of elements, the control apparatus 350 determines, for each element, whether there is an abnormality, controls the activation period of the self-maintaining function according to the type of abnormality, i.e., according to which, if any, element the abnormality has occurred in, and either immediately stops supplying power to the actuator 310 or determines whether or continue supplying power for each element.

Figure 2:
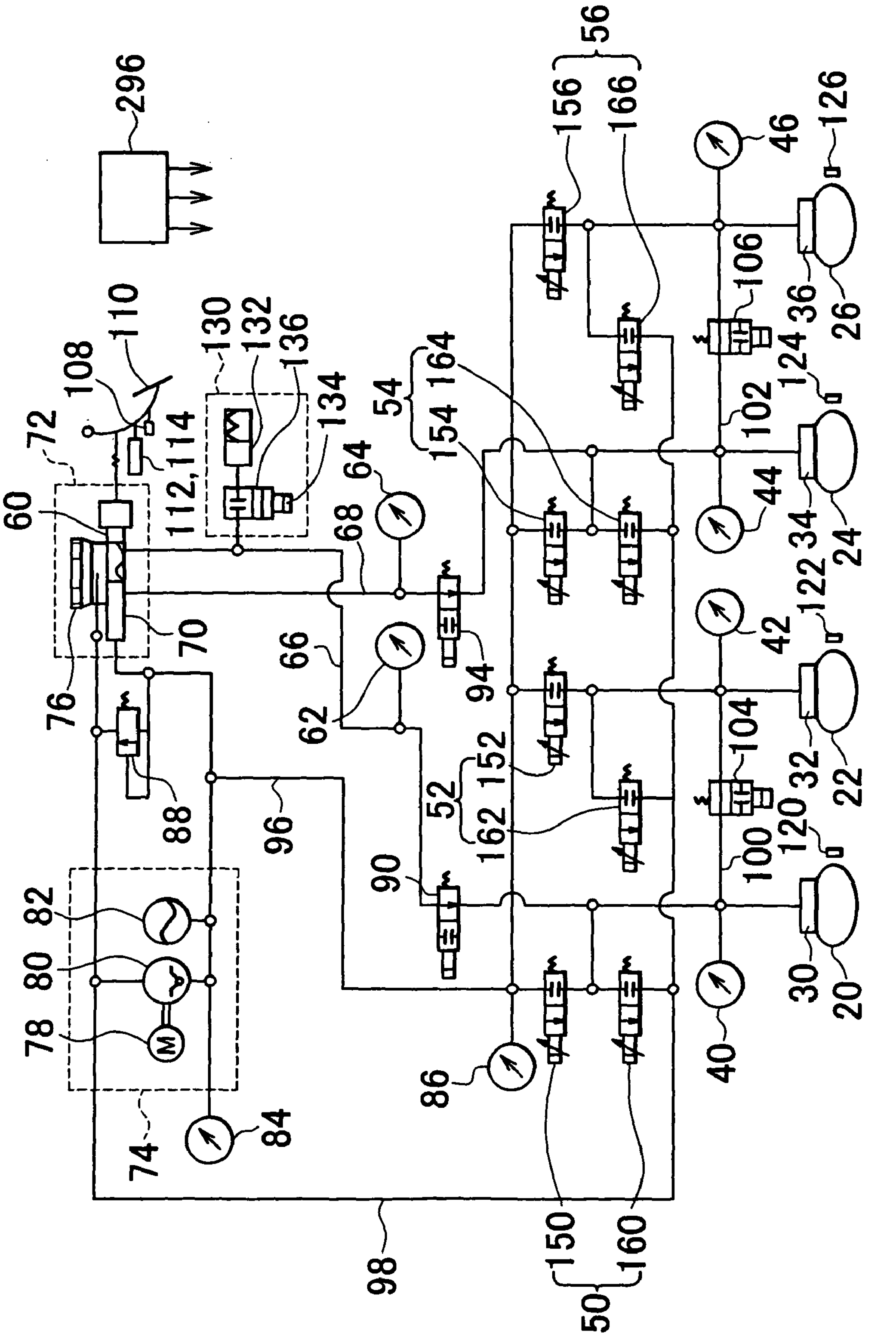
FIG. 2 is a block diagram of an electronically controlled brake system to which the power supply control apparatus according to the exemplary embodiment can be applied.

An example in which the actuator 310 is an electronically controlled brake system will now be described in detail. FIG. 2 shows the configuration of an electronically controlled brake system to which the power supply control system according to this exemplary embodiment can be applied. The electronically controlled brake system includes right and left front-wheel wheel cylinders 30 and 32 corresponding to right and left front wheels 20 and 22, respectively, and right and left rear-wheel wheel cylinders 34 and 36 corresponding to right and left rear wheels 24 and 26, respectively.

A hydro-booster equipped master cylinder 72 includes a hydro-booster 70 and a master cylinder 60. The hydro-booster 70 supplies high pressure brake fluid from a high-pressure hydraulic source 74, to be described later, to a pressure chamber of the master cylinder 60 as hydraulic pressure that assists the depression force on a brake pedal 110. The master cylinder 60 delivers hydraulic pressure that corresponds with a depression operation of the brake pedal 110 to first and second fluid lines 66 and 68. In this case, the hydro-booster 70 functions as a hydraulic pressure multiplying device.

The master cylinder 60 has two pressure chambers within which hydraulic pressure is generated according to operation of the brake pedal 110. One of the pressure chambers is connected to the right and left front-wheel wheel cylinders 30 and 32 via the first fluid line 66. The other of the pressure chambers is connected to the right and left rear-wheel wheel cylinders 34 and 36 via the second fluid line 68.

The first fluid line 66 branches into two midway, with one branch connecting to the right front-wheel wheel cylinder 30 and the other branch connecting to the left front-wheel wheel cylinder 32 via a first connecting line 100 in which is provided a first communication valve 104. Similarly, the second fluid line 68 also branches into two midway, with one branch connecting to the right rear-wheel wheel cylinder 34 and the other branch connecting to the left rear-wheel wheel cylinder 36 via a second communication line 102 in which is provided a second communication valve 106.

The first fluid line 66 is provided with a first master cut-off valve 90. Opening and closing of this first master cut-off valve 90 connects and disconnects the wheel cylinders 30 and 32 to and from the master cylinder 60. The first master cut-off valve 90 is an electromagnetic check valve that is open during normal operation. This first master cut-off valve 90 is controlled by a control apparatus 296, which will be described later, so as to block off the passage upon receiving a drive signal. The second fluid line 68 is similarly provided with a second master cut-off valve 94, which operates in the same way as the first master cut-off valve 90.

A reservoir tank 76, which stores brake fluid, is provided above the master cylinder 60. Brake fluid is able to flow between the reservoir tank 76 and the two pressure chambers of the master cylinder 60 when depression force on the brake pedal 110 is released.

The high-pressure hydraulic source 74 includes a pump 80, an accumulator 82, and a pump motor 78. Brake fluid in the reservoir tank 76 is pressurized by the pump 80 and stored in the accumulator 82. The pump 80 is driven by the pump motor 78, which is controlled by the control apparatus 296, to be described later. The high-pressure hydraulic source 74 is connected via a third fluid line 96 to the wheel cylinders 30, 32, 34, and 36. Similarly, the wheel cylinders 30, 32, 34, and 36 are connected to the reservoir tank 76 via a fourth fluid line 98.

A right front-wheel pressure increase valve 150, left front-wheel pressure increase valve 152, right rear-wheel pressure increase valve 154, and left rear-wheel pressure increase valve 156 are provided in the third fluid line 96, and a right front-wheel pressure decrease valve 160, left front-wheel pressure decrease valve 162, right rear-wheel pressure decrease valve 164, and left rear-wheel pressure decrease valve 166 are provided in the fourth fluid line 98.

The right front-wheel pressure increase valve 150 and right front-wheel pressure decrease valve 160 correspond to the right front-wheel wheel cylinder 30 and together are referred to as a right front-wheel linear valve set 50. Similarly, the left front-wheel pressure increase valve 152 and left front-wheel pressure decrease valve 162 correspond to the left front-wheel wheel cylinder 32 and together are referred to as a left front-wheel linear valve set 52, the right rear-wheel pressure increase valve 154 and right rear-wheel pressure decrease valve 164 correspond to the right rear-wheel wheel cylinder 34 and together are referred to as a right rear-wheel linear valve set 54, and the left rear-wheel pressure increase valve 156 and left rear-wheel pressure decrease valve 166 correspond to the left rear-wheel wheel cylinder 36 and together are referred to as a left rear-wheel linear valve set 56.

All of the linear valve sets 50, 52, 54, and 56 are electromagnetic check valves that are closed during normal operation. When a drive signal is output from the control apparatus 296, which will be described later, the valve opens or closes an amount proportionate to the current according to that drive signal. Accordingly, the hydraulic pressure to each of the wheel cylinders 30, 32, 34, and 36 can be controlled independently and linearly by controlling the corresponding linear valve sets 50, 52, 54, and 56.

Each of the pressure increase valves 150, 152, 154, 156, the pressure decrease valves 160, 162, 164, 166, the master cut-off valves 90 and 94, and the communication valves 104 and 106 functions as a hydraulic pressure control valve. The power supplied to each of these hydraulic pressure control valves is controlled by the control apparatus 296.

First and second accumulator pressure sensors 84 and 86 are provided upstream of the pressure increase valves 150, 152, 154, and 156 in the third fluid line 96. These first and second accumulator pressure sensors 84 and 86 detect the hydraulic pressure stored in the accumulator 82. The first accumulator pressure sensor 84 is located near the accumulator 82 and the second accumulator pressure sensor 86 is located near the pressure increase valves 150, 152, 154, and 156. A relief valve 88 is provided near an outlet of the accumulator 82 so that if the hydraulic pressure in the accumulator 82 becomes greater than a predetermined upper limit value, the relief valve 88 opens to return brake fluid to the reservoir tank 76 so that brake fluid that is equal to, or less than, the predetermined upper limit value is always stored in the accumulator 82.

A stroke simulator apparatus 130 is provided off of the first fluid line 66 which connects the master cylinder 60 with the first master cut-off valve 90. This stroke simulator apparatus 130 includes a stroke simulator 132 and a stroke simulator check-valve 134. By energizing or de-energizing a coil 136 of the stroke simulator check-valve 134, the passage between the stroke simulator 132 and the master cylinder 60 is opened or closed.

Although not shown in the drawing, the stroke simulator 132 is provided with a piston inside a cylinder. This piston is elastically urged in a predetermined direction.

Near the brake pedal 110 are provided a first and second stoke sensors 112 and 114, which measure the stroke of the brake pedal 110, and a brake switch 108 which detects when the brake pedal 110 is in a depressed state.

Further, a first master cylinder pressure sensor 62, which detects the hydraulic pressure of the master cylinder 60, is provided between the master cylinder 60 and the first master cut-off valve 90 in the first fluid line 66. Similarly, a second master cylinder pressure sensor 64, which detects the hydraulic pressure of the master cylinder 60, is provided between the master cylinder 60 and the second master cut-off valve 94 in the second fluid line 68.

Downstream of the pressure increase valves 150, 152, 154, and 156, or downstream of the first and second master cut-off valves 90 and 94 in the fluid line near the wheel cylinders 30, 32, 34, and 36 are provided a right front-wheel wheel cylinder pressure sensor 40 that detects the hydraulic pressure of the right front-wheel wheel cylinder 30, a left front-wheel wheel cylinder pressure sensor 42 that detects the hydraulic pressure of the left front-wheel wheel cylinder 32, a right rear-wheel wheel cylinder pressure sensor 44 that detects the hydraulic pressure of the right rear-wheel wheel cylinder 34, and a left rear-wheel wheel cylinder pressure sensor 46 that detects the hydraulic pressure of the left rear-wheel wheel cylinder 36.

A right front-wheel speed sensor 120 is provided in the right front wheel 20, a left front-wheel speed sensor 122 is provided in the left front wheel 22, a right rear-wheel speed sensor 124 is provided in the right rear wheel 24, and a left rear-wheel speed sensor 126 is provided in the left rear wheel 26. These wheel speed sensors 120, 122, 124, and 126 each detect the rotational speed of the wheels 20, 22, 24, and 26 to which they correspond. A slip state of each wheel, as well as an estimated vehicle speed and the like are calculated based on the rotational speed detected by the wheel speed sensors 120, 122, 124, and 126, and used for anti-lock control and traction control.

Next, three braking modes in the electronically controlled brake system will be described.

In the first brake mode, the wheel cylinders 30, 32, 34, and 36 are operated by brake fluid from the high-pressure hydraulic source 74. In this first brake mode, the first and second master cut-off valves 90 and 94 are closed so the first and second fluid lines 66 and 68 are closed off. As a result, supply of hydraulic pressure from the hydro-booster equipped master cylinder 72 is interrupted. Also, the first and second communication valves 104 and 106 are closed so the first and second connecting lines 100 and 102 are also closed off. In this case, when the brake pedal 110 is depressed, a target braking force is calculated in the control apparatus 296 based on detection values from the first and second stoke sensors 112 and 114 and the first and second master cylinder pressure sensors 62 and 64. The high-pressure hydraulic source 74 and the pressure increase valves 150, 152, 154, and 156 are then controlled based on the calculated target braking force so that the hydraulic pressure generated by the pump 80 is supplied to the wheel cylinders 30, 32, 34, and 36 through the third fluid line 96. Then, when the actual braking force reaches the target braking force, the brake fluid supplied to the wheel cylinders 30, 32, 34, and 36 is returned to the reservoir tank 76 via the pressure decrease valves 160, 162, 164, 166 and the fourth fluid line 98.

In the first brake mode, the stroke simulator check-valve 134 is switched open such that the brake fluid flows into the hydraulic pressure chamber of the stroke simulator 132 against the elastic force of an elastic body. The reaction force of this elastic body creates a pseudo brake operation feeling, thereby keeping the driver from feeling an unpleasant sensation. The stroke simulator check-valve 134 is controlled by the control apparatus 296 energizing or de-energizing the coil 136.

The second brake mode is selected when the first brake mode is unable to be used due to an abnormality occurring in the high-pressure hydraulic source 74, the first or second master cut-off valves 90 or 94, the linear valve sets 50, 52, 54, or 56, the first or second CPUs 290 or 292, or any of the sensors, or the like. The master cylinder 60, which is mechanically connected to the brake pedal, supplies hydraulic pressure to the wheel cylinders 30, 32, 34, and 36 via the first and second fluid lines 66 and 68. At this time, the high hydraulic pressure stored in the accumulator 82 is supplied to the hydro-booster 70 such that a brake pedal depression assist force in accordance with the depression of the brake pedal 110 is added to the pressure chamber of the master cylinder 60.

The first and second fluid lines 66 and 68 are open because the first and second master cut-off valves 90 and 94 are open. Also, the first and second connecting lines 100 and 102 are open because the first and second communication valves 104 and 106 are open.

The linear valve sets 50, 52, 54, and 56, which are electromagnetic check valves that are closed during normal operation, are kept closed so brake fluid does not flow through the third fluid line 96 toward the hydro-booster equipped master cylinder 72. In the second brake mode, pressure from the hydro-booster 70 enables hydraulic pressure of the same degree as that in the first brake mode to be supplied to the wheel cylinders 30, 32, 34, 36.

The third brake mode is selected when the hydro-booster 70 and high-pressure hydraulic source 74 are no longer able to operate due to an abnormality in the vehicle battery 230 or an abnormality, such as a disconnection of a signal wire, in the electrical system. Hydraulic pressure according to the depression of the brake pedal 110 is supplied from the master cylinder 60 to the wheel cylinders 30, 32, 34, and 36 via the first and second fluid lines 66 and 68. The electromagnetic check valves are controlled just as they are in the second brake mode.

Figure 3:
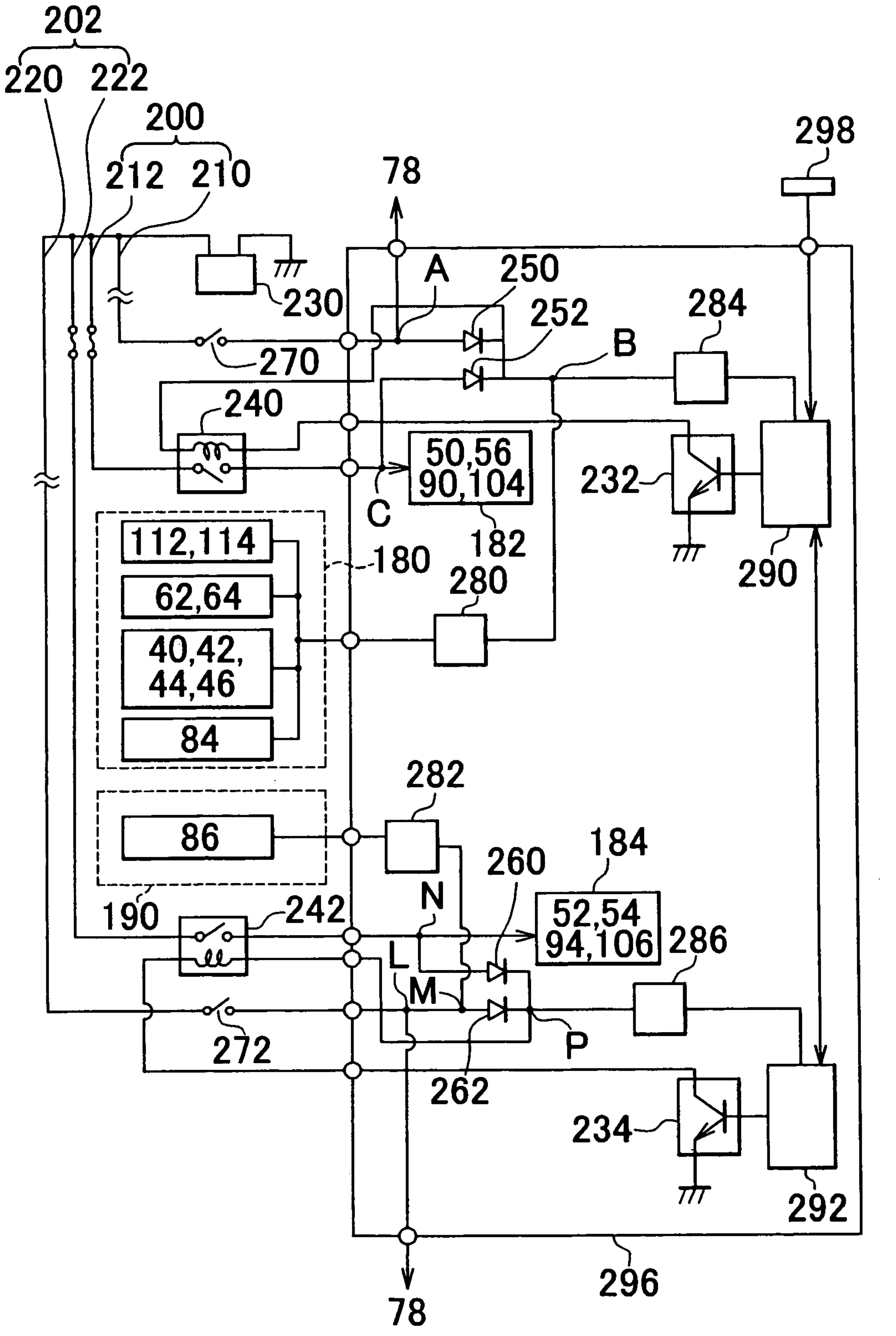
FIG. 3 is an electrical circuit diagram of the electronically controlled brake system to which the power supply control apparatus according to the exemplary embodiment can be applied.

FIG. 3 is an electric circuit diagram of the electronically controlled brake system. The control apparatus 296 has as its main components the first and second CPUs 290 and 292, and also includes ROM, RAM and an input/output portion. The first CPU 290 is connected to the first and second stoke sensors 112 and 114, the first and second master cylinder pressure sensors 62 and 64, the wheel cylinder pressure sensors 40, 42, 44, and 46, the first accumulator pressure sensor 84, the brake switch 108, and the wheel speed sensors 120, 122, 124, and 126 (the brake switch 108 and wheel speed sensors 120, 122, 124, and 126 are not shown in this drawing). In addition, various sensors (not shown in the drawing) such as an acceleration sensor and a yaw rate sensor, as well as various detectors (also not shown in the drawing) used in various types of control such as ordinary brake control, anti-lock control, traction control, vehicle behavior control, and accumulator control, are also connected to the control apparatus 296. The detection values from the various sensors and detectors are input to the first CPU 290. An output from an occupant detection switch 298 is also input to the first CPU 290. The occupant detection switch 298 is, for example, a switch that is linked to the fastening of a seatbelt or a switch that is linked to a door handle next to the driver's seat. The second accumulator pressure sensor 86 is connected to the second CPU 292.

More specifically, the first CPU 290 controls the driving of the pump 80 in order to keep the accumulator 82 within a predetermined pressure range. The first CPU 290 also controls the opening amounts of the electromagnetic check valves that open and close the fluid lines 66, 68, 96, and 98. Signals indicative of the pedal stroke from the first and second stoke sensors 112 and 114, as well as signals indicative of the master cylinder pressure from the first and second master cylinder pressure sensors 62 and 64 are input to the first CPU 290. The control apparatus 296 detects the brake operation amount based on the detection values from these four sensors. During ordinary braking, the control apparatus 296 calculates a target braking force based on the braking force required by the driver that is detected by the first and second stoke sensors 112 and 114 and the first and second master cylinder pressure sensors 62 and 64. In this case, two of each sensor are provided so that one can compensate for the other, i.e., in order to increase the degree of failsafe. Therefore, even if an abnormality occurs in one of the first and second stoke sensors 112 and 114 or one of the first and second master cylinder pressure sensors 62 and 64, the control apparatus 296 is still able to detect the brake operation amount.

The vehicle battery 230 is a chargeable battery provided in the vehicle, and supplies power as necessary to various component parts of the electronically controlled brake system. The vehicle battery 230 and control apparatus 296 are connected to first and second ignition switches 270 and 272 via the first and second main relays 240 and 242. The first and second ignition switches 270 and 272 may also be referred to simply as "ignition switch".

The first and second ignition switches 270 and 272 are off when not operated by the driver, and turned on by an operation performed by the driver to start a vehicle system such as the engine. The first and second main relays 240 and 242, which turn the current on and off, are off when the first and second ignition switches 270 and 272 are not operated. When the first and second ignition switches 270 and 272 are turned on, the first and second main relays 240 and 242 are turned on by their corresponding CPUs.

A total of four power supply wires 210, 212, 220, and 222 are provided that are routed through the first and second ignition switches 270 and 272, and the first and second main relays 240 and 242. These four power supply wires 210, 212, 220, and 222 are divided between two systems, the first being a first system 200 that supplies power through the first and second power supply wires 210 and 212, and the second being a second system 202 that supplies power through the third and fourth power supply wires 220 and 222. The first system 200 supplies power to a first component part first component part 180, which includes the first accumulator pressure sensor 84, the first and second master cylinder pressure sensors 62 and 64, the first and second stoke sensors 112 and 114, and the wheel cylinder pressure sensors 40, 42, 44, and 46. The second system 202 supplies power to a second component part 190, which includes the second accumulator pressure sensor 86.

The first CPU 290, the right front-wheel and left rear-wheel linear valve sets 50 and 56, the first master cut-off valve 90, and the first communication valve 104 are connected to the first system 200. The second CPU 292, the left front-wheel and right rear-wheel linear valve sets 52 and 54, the second master cut-off valve 94, and the second communication valve 106 are connected to the second system 202. The first master cut-off valve 90, the right front-wheel and left rear-wheel linear valve sets 50 and 56, and the first communication valve 104 may also be collectively referred to as a first hydraulic pressure control valve set 182. Similarly, the second master cut-off valve 94, the left front-wheel and right rear-wheel linear valve sets 52 and 54, and the second communication valve 106 may also be collectively referred to as a second hydraulic pressure control valve set 184.

The wiring of the electronically controlled brake system will now be described in detail. As described above, the first system 200 is connected to the control apparatus 296 by the first power supply wire 210 via the first ignition switch 270, as well as by the second power supply wire 212 via the first main relay 240. The first power supply wire 210 is connected to a first branch point A, as well as to a second branch point B via a first diode 250. A wire that branches from the second branch point B is connected, so as to supply power, to a first pressure reducing circuit 280 and another wire that branches from the second branch point B is connected, so as to supply power, to a second pressure reducing circuit 284. Although not shown in the drawing, a wire that branches from the first branch point A is connected to a motor relay. This motor relay is connected, so as to supply power, to the pump motor 78 of the high-pressure hydraulic source 74. Power is supplied to the first component part 180 from the first pressure reducing circuit 280. The first diode 250 allows current to flow only from left to right in the drawing, while preventing it from flowing from right to left. Similarly, a second diode 252, a third diode 260, and a fourth diode 262, to be described later, also only allow current to flow from left to right in the drawing.

The second power supply wire 212 is connected to the first main relay 240, a third branch point C, and the second branch point B via the second diode 252. A wire that branches from the third branch point C is connected to the first hydraulic pressure control valve set 182.

The second system 202 is connected to the control apparatus 296 by the third power supply wire 220 via the second ignition switch 272, as well as by the fourth power supply wire 222 via the second main relay 242. The third power supply wire 220 is connected to a fourth branch point L, a fifth branch point M, and a seventh branch point P via the fourth diode 262. The third power supply wire 220 is connected to a fourth pressure reducing circuit 286 from the seventh branch point P and supplies power to the second CPU 292 via this fourth pressure reducing circuit 286. A wire that branches from the fourth branch point L is connected to the pump motor 78 via the motor relay. This motor relay is wired to both the first system 200 and the second system 202 so that power can be supplied to the pump motor 78 even if an abnormality occurs in one of the systems. A wire that branches from the fifth branch point M is connected to a third pressure reducing circuit 282 and supplies power to the second component part 190 via the third pressure reducing circuit 282. The third power supply wire 222 is connected to the second main relay 242, a sixth branch point N, and the seventh branch point P via the third diode 260. A wire that branches from the sixth branch point N is connected to the second hydraulic pressure control valve set 184.

The pressure reducing circuits 280, 282, 284, and 286 convert the voltage of the vehicle battery 230 to the voltage required by each of the component parts to which they are connected.

Next, a brake mode will be described which is used when an abnormality has occurred in one of the second power supply wire 212 of the first system 200 or the fourth power supply wire 222 of the second system 202. For example, if an abnormality has occurred in the second power supply wire 212, the first master cut-off valve 90, the right front-wheel and left rear-wheel linear valve sets 50 and 56, and the first communication valve 104, all of which receive power from the second power supply wire 212, become inoperable.

When describing this case referring back to FIG. 2 again, hydraulic pressure supplied from the high-pressure hydraulic source 74 is supplied through the third fluid line 96 to the left front-wheel and right rear-wheel wheel cylinders 32 and 34 via the left front-wheel and right rear-wheel pressure increase valves 152 and 154, both of which are operable. Because the second communication valve 106 is kept open, hydraulic pressure is also supplied to the left rear-wheel wheel cylinder 36 through the second connecting line 102. Meanwhile, because the first master cut-off valve 90, which is an electromagnetic check valve that is open during normal operation, is open, hydraulic pressure generated by the hydro-booster equipped master cylinder 72 is supplied through the first fluid line 66 to the right front-wheel wheel cylinder 30 via the first maser cut-off valve 90. Hydraulic pressure flowing through the first connecting line 100 is cut-off by the first communication valve 104.

According to the structure of the exemplary embodiment described above, even if an abnormality occurs in one of the second power supply wire 212 or the fourth power supply wire 222, hydraulic pressure is still able to be supplied to three wheels. Further, the remaining fourth wheel can still be braked with high pressure from the supply of high hydraulic pressure resulting from the brake pedal depression assist force generated by the hydro-booster 70.

The first component part 180 and the second component part 190 will now be described referring to FIG. 3 again. The first component part 180 is a component part for executing the first brake mode. The second accumulator pressure sensor 86, which serves as the second component part 190, is a component part for the failsafe, which functions similar to the first accumulator pressure sensor 84. The hydraulic pressure of the accumulator 82 is able to be detected as long as at least one of these component parts is operative.

If the brake pedal 110 is depressed, power is supplied from the second power supply wire 212 to the first component part 180 via the first main relay 240 for a predetermined period of time after the ignition switch has been turned off. Similarly, power is supplied to the electromagnetic check valves and the first and second CPUs 290 and 292 via the first and second main relays 240 and 242 for a predetermined period of time after the first and second ignition switches 270 and 272 have been turned off. Because the first component part 180 is provided with the sensors necessary to perform hydraulic pressure brake control, which is the first brake mode, hydraulic pressure can be supplied to the wheel cylinders 30, 32, 34, and 36 according to the first brake mode when the first ignition switch 270 is off just as it is when the first ignition switch 270 is on. As a result, the relationship between the depression amount of the brake pedal 110 and the braking force no longer differs greatly from when the ignition switch is on, thus avoiding an unpleasant sensation from being imparted to the driver.

In this exemplary embodiment, one second accumulator pressure sensor 86 is selected as the second component part 190. The invention is not limited to this, however. For example, taking into account power consumption, function, and braking requirements, a master cylinder pressure sensor, wheel cylinder pressure sensor, electromagnetic check valve, CPU, or pump and the like may also serve as the second component part 190.

Figure 4:
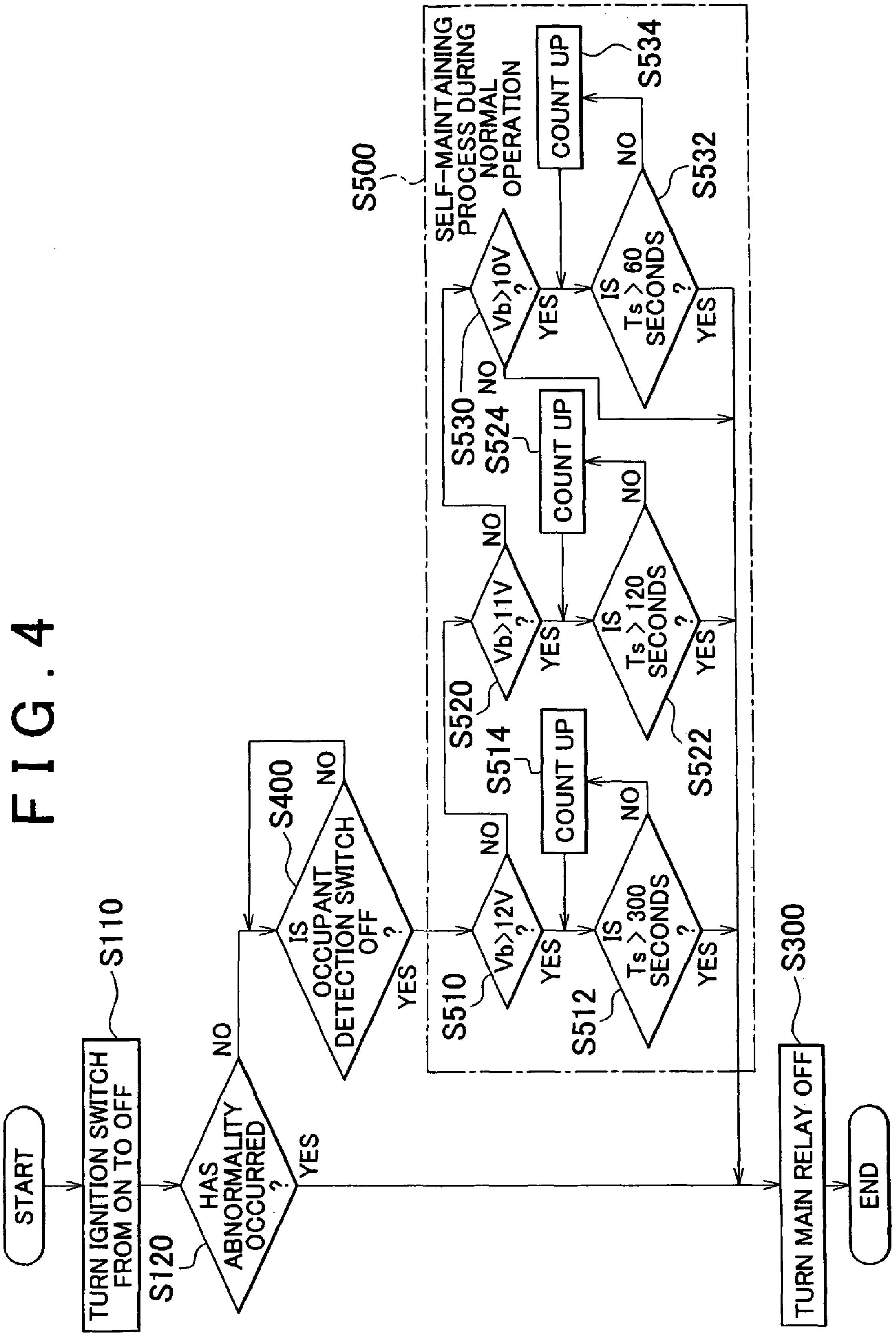
FIG. 4 is a flowchart illustrating a control routine of first and second main relays when first and second ignition switches are turned from on to off in the power supply control apparatus according to the exemplary embodiment of the invention.

FIG. 4 is a flowchart illustrating a control routine of the first and second main relays 240 and 242 when the first and second ignition switches 270 and 272 are turned from on to off. In this routine, when an abnormality occurs in the electronically controlled brake system, the first and second main relays 240 and 242 immediately turn off. When there is no abnormality, power is supplied from the vehicle battery 230 for a predetermined period of time by the self-maintaining function, thus enabling the electronically controlled brake system to operate. The predetermined period is selected from among three types, depending on the voltage of the vehicle battery 230 when the first and second ignition switches 270 and 272 are turned from on to off. The period during which the first and second main relays 240 and 242 are turned on when the first and second ignition switches 270 and 272 are turned from on to off is also referred to hereinafter as "self-maintaining period Ts".

When the first and second ignition switches 270 and 272 are turned from on to off (step S110), the first and second CPUs 290 and 292 determine whether there is an abnormality in the electronically controlled brake system (step S120). More specifically, the first CPU 290 determines whether there is an abnormality in the first component part 180, first hydraulic pressure control valve set 182, vehicle battery 230, and pump motor 78 in the first system 200. The second CPU 292 determines whether there is an abnormality in the second component part 190 and the second hydraulic pressure control valve set 184 in the second system 202. The first and second CPUs 290 and 292 then communicate the detection results to each other, and when it has been determined by either of the first and second CPUs 290 and 292 that there is an abnormality (i.e., YES in step S120), the first and second CPUs 290 and 292 immediately turn off the first and second main relays 240 and 242, respectively (step S300).

If both the first and second CPUs 290 and 292 determine that there is no abnormality (i.e., NO in step S120), the first CPU 290 then determines whether the occupant detection switch 298 is turned off (step S400). If the occupant detection switch 298 is on (i.e., NO in step S400), the first and second CPUs 290 and 292 keep the first and second main relays 240 and 242, respectively, on because of the possibility that the brake pedal 110 is being depressed in order to brake the vehicle, and continue to repeat the process of step S400 to determine whether the occupant detection switch 298 is off.

If it is determined that the occupant detection switch 298 is off (i.e., YES in step S400), the first and second main relays 240 and 242 are kept on for a predetermined period in a self-maintaining process during normal operation (step S500). In this self-maintaining process during normal operation, the period for which the first and second main relays 240 and 242 are kept on is changed according to a voltage Vb of the vehicle battery 230.

In the process in step S500, the first CPU 290 first determines whether the voltage Vb is greater than 12V (step S510). If the voltage Vb is greater than 12V (i.e., YES in step S510), the first CPU 290 sets the self-maintaining time Ts to 300 seconds, starts a timer provided in the first CPU 290, and then determines whether the self-maintaining time Ts is longer than 300 seconds (step S512). If the self-maintaining time Ts is not longer than 300 seconds (i.e., NO in step S512), the first CPU 290 counts up with the timer (step S514) and continues to repeat the processes in steps S512 and S514 until the self-maintaining time Ts exceeds 300 seconds. If the self-maintaining time Ts is longer than 300 seconds (i.e., YES in step S512), the first CPU 290 communicates this to the second CPU 292, and the first and second CPUs 290 and 292 turn off the first and second main relays 240 and 242, respectively (step S300).

If, in the process in step S510, the voltage Vb is equal to, or less than, 12V (i.e., NO in step S510), the first CPU 290 then determines whether the voltage Vb is greater than 11V (step S520). If the voltage Vb is greater than 11V (i.e., YES in step S520), the first CPU 290 sets the self-maintaining time Ts to 120 seconds, starts the timer provided in the first CPU 290, and then determines whether the self-maintaining time Ts is longer than 120 seconds (step S522). If the self-maintaining time Ts is not longer than 120 seconds (i.e., NO in step S522), the first CPU 290 counts up with the timer (step S524) and continues to repeat the processes in steps S522 and S524 until the self-maintaining time Ts exceeds 120 seconds. If the self-maintaining time Ts is longer than 120 seconds (i.e., YES in step S522), the first CPU 290 communicates this to the second CPU 292, and the first and second CPUs 290 and 292 turn off the first and second main relays 240 and 242, respectively (step S300).

If, in the process in step S520, the voltage Vb is equal to, or less than, 11V (i.e., NO in step S520), the first CPU 290 then determines whether the voltage Vb is greater than 10V (step S530). If the voltage Vb is greater than 10V (i.e., YES in step S530), the first CPU 290 sets the self-maintaining time Ts to 60 seconds, starts the timer provided in the first CPU 290, and then determines whether the self-maintaining time Ts is longer than 60 seconds (step S532). If the self-maintaining time Ts is not longer than 60 seconds (i.e., NO in step S532), the first CPU 290 counts up with the timer (step S534) and continues to repeat the processes in steps S532 and S534 until the self-maintaining time Ts exceeds 60 seconds. If the self-maintaining time Ts is longer than 60 seconds (i.e., YES in step S532) or if the voltage Vb is equal to, or less than, 10V in the process in step S530 (i.e., NO in step S530), the first CPU 290 communicates this to the second CPU 292, and the first and second CPUs 290 and 292 turn off the first and second main relays 240 and 242, respectively (step S300).

After the self-maintaining time Ts has been set, the first CPU 290 may also change the amount of power supplied according to an elapsed time. For example, the first CPU 290 may execute a process to reduce the voltage supplied from the first voltage reducing circuit 280 by 0.2 V every 10 seconds. The first and second CPUs 290 and 292 may also reduce the number of component parts to which power is supplied, according to the elapsed time, thereby reducing the amount of power consumed.

According to the routine described above, it is possible to stop the supply of power or reduce the amount of power supplied from the vehicle battery 230 by turning the first and second ignition switches 270 and 272 off when an abnormality occurs in the electronically controlled brake system. As a result, it is possible to prevent the continued use of an electronically controlled brake system in which an abnormality has occurred. Further, by reducing or stopping the power supplied to a system in which an abnormality has occurred, it is possible to inhibit the abnormality from becoming more severe, as well as inhibit the abnormality from affecting other parts that are operating normally and other related systems. Moreover, because the period during which the self-maintaining function is active is able to be set according to the voltage Vb of the vehicle battery 230, it is possible to inhibit the voltage of the vehicle battery 230 from dropping to the voltage Vb which may interfere with starting of the vehicle thereafter.

Figure 5:
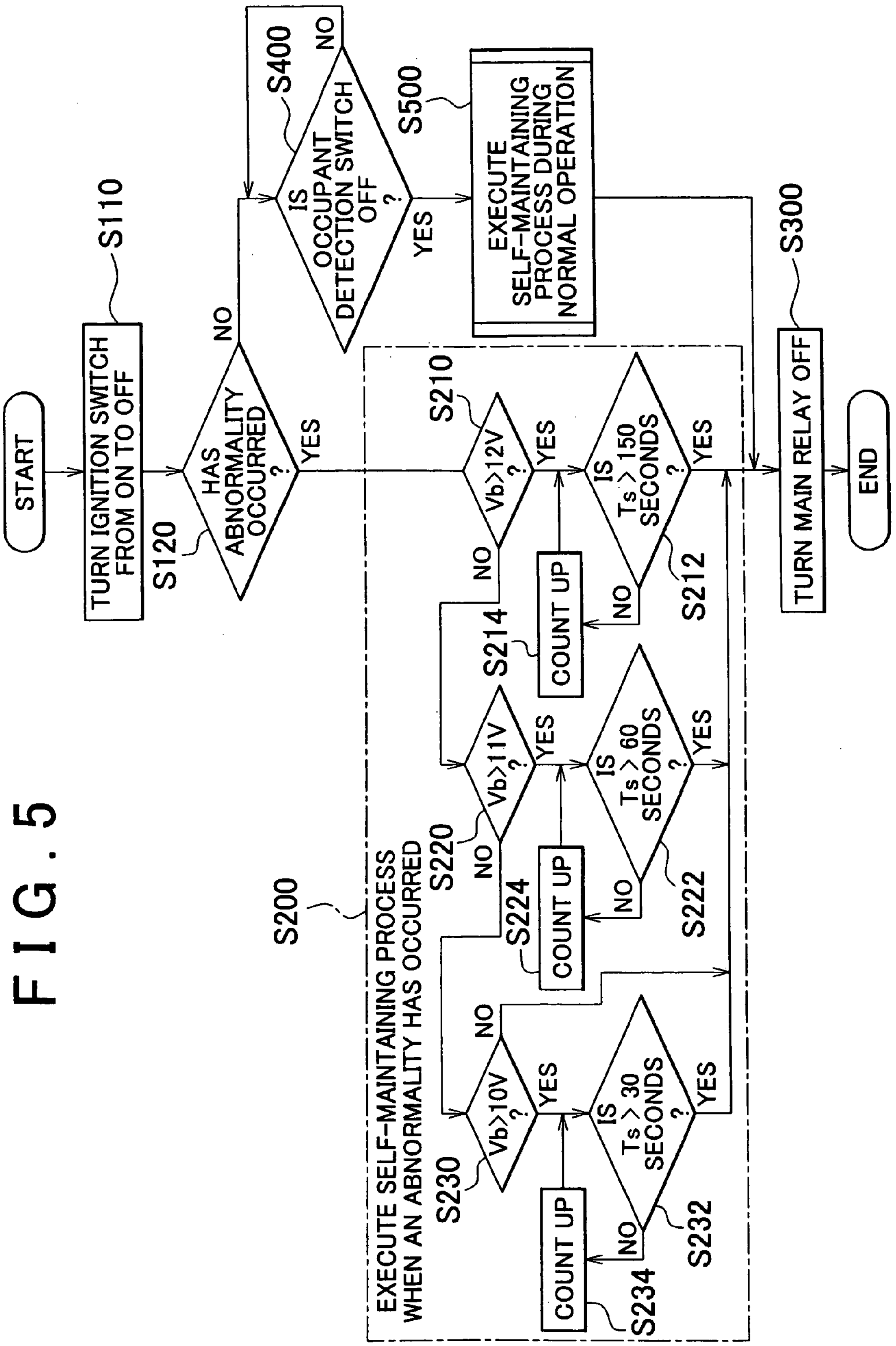
FIG. 5 is a flowchart illustrating a modified example of the control routine shown in FIG. 4, in the power supply control apparatus according to the exemplary embodiment of the invention.

FIG. 5 is a flowchart illustrating a modified example of the control routine shown in FIG. 4. The difference between the control routine in FIG. 5 and the control routine in FIG. 4 is that, when it has been determined in step S120 that an abnormality has occurred (i.e., YES in step S120), the first and second ignition switches 270 and 272 are immediately turned off in the control routine in FIG. 4, whereas, in the control routine in FIG. 5, there is a process for determining whether to set the self-maintaining time Ts according to the voltage Vb of the vehicle battery 230, as a self-maintaining process when an abnormality has occurred, or immediately turn off the first and second ignition switches 270 and 272. The following description will mainly focus on the self-maintaining process when an abnormality has occurred. Because the self-maintaining process during normal operation of step S500 is the same as it is in the routine shown in FIG. 4, a detailed explanation thereof will be omitted.

If it is determined in the process in step S120 that there is an abnormality (i.e., YES in step S120), the first and second main relays 240 and 242 are kept on for a predetermined period of time as the self-maintaining process when an abnormality has occurred (step S200). In the self-maintaining process when an abnormality has occurred, the period for keeping the first and second main relays 240 and 242 on is changed according to the voltage Vb of the vehicle battery 230. The difference between this process and the self-maintaining process during normal operation is that, in this process, the self-maintaining time Ts is set shorter than it is in the self-maintaining process during normal operation. More specifically, it is set to half as long as it is in the self-maintaining process during normal operation.

In the process in step S200, the first CPU 290 first determines whether the voltage Vb is greater than 12V (step S210). If the voltage Vb is greater than 12V (i.e., YES in step S210), the first CPU 290 sets the self-maintaining time Ts to 150 seconds, starts a timer provided in the first CPU 290, and then determines whether the self-maintaining time Ts is longer than 150 seconds (step S212). If the self-maintaining time Ts is not longer than 150 seconds (i.e., NO in step S212), the first CPU 290 counts up with the timer (step S214) and continues to repeat the processes in steps S212 and S214 until the self-maintaining time Ts exceeds 150 seconds. If the self-maintaining time Ts is longer than 150 seconds (i.e., YES in step S212), the first CPU 290 communicates this to the second CPU 292, and the first and second CPUs 290 and 292 turn off the first and second main relays 240 and 242, respectively (step S300).

If, in the process in step S210, the voltage Vb is equal to, or less than, 12V (i.e., NO in step S210), the first CPU 290 then determines whether the voltage Vb is greater than 11V (step S220). If the voltage Vb is greater than 11V (i.e., YES in step S220), the first CPU 290 sets the self-maintaining time Ts to 60 seconds, starts the timer provided in the first CPU 290, and then determines whether the self-maintaining time Ts is longer than 60 seconds (step S222). If the self-maintaining time Ts is not longer than 60 seconds (i.e., NO in step S222), the first CPU 290 counts up with the timer (step S224) and continues to repeat the processes in steps S222 and S224 until the self-maintaining time Ts exceeds 60 seconds. If the self-maintaining time Ts is longer than 60 seconds (i.e., YES in step S222), the first CPU 290 communicates this to the second CPU 292, and the first and second CPUs 290 and 292 turn off the first and second main relays 240 and 242, respectively (step S300).

If, in the process in step S220, the voltage Vb is equal to, or less than, 11V (i.e., NO in step S220), the first CPU 290 then determines whether the voltage Vb is greater than 10V (step S230). If the voltage Vb is greater than 10V (i.e., YES in step S230), the first CPU 290 sets the self-maintaining time Ts to 30 seconds, starts the timer provided in the first CPU 290, and then determines whether the self-maintaining time Ts is longer than 30 seconds (step S232). If the self-maintaining time Ts is not longer than 30 seconds (i.e., NO in step S232), the first CPU 290 counts up with the timer (step S234) and continues to repeat the processes in steps S232 and S234 until the self-maintaining time Ts exceeds 30 seconds. If the self-maintaining time Ts is longer than 30 seconds (i.e., YES in step S232) or if the voltage Vb is equal to, or less than, 10V in the process in step S230 (i.e., NO in step S230), the first CPU 290 communicates this to the second CPU 292, and the first and second CPUs 290 and 292 turn off the first and second main relays 240 and 242, respectively (step S300).

In this self-maintaining process when an abnormality has occurred, as well, the amount of power supplied may be changed according to the elapsed time after the self-maintaining time Ts has been set. The process for changing the amount of power supplied according to the elapsed time may also be applied only to those component parts in which an abnormality has occurred.

According to the routine described above, if an abnormality occurs in the electrically controlled brake system, the self-maintaining time Ts can be set to an optimal period according to the voltage of the vehicle battery 230, thereby enabling the supply of power to the system in which the abnormality has occurred to be reduce while maintaining braking performance of the vehicle.

Figure 6:
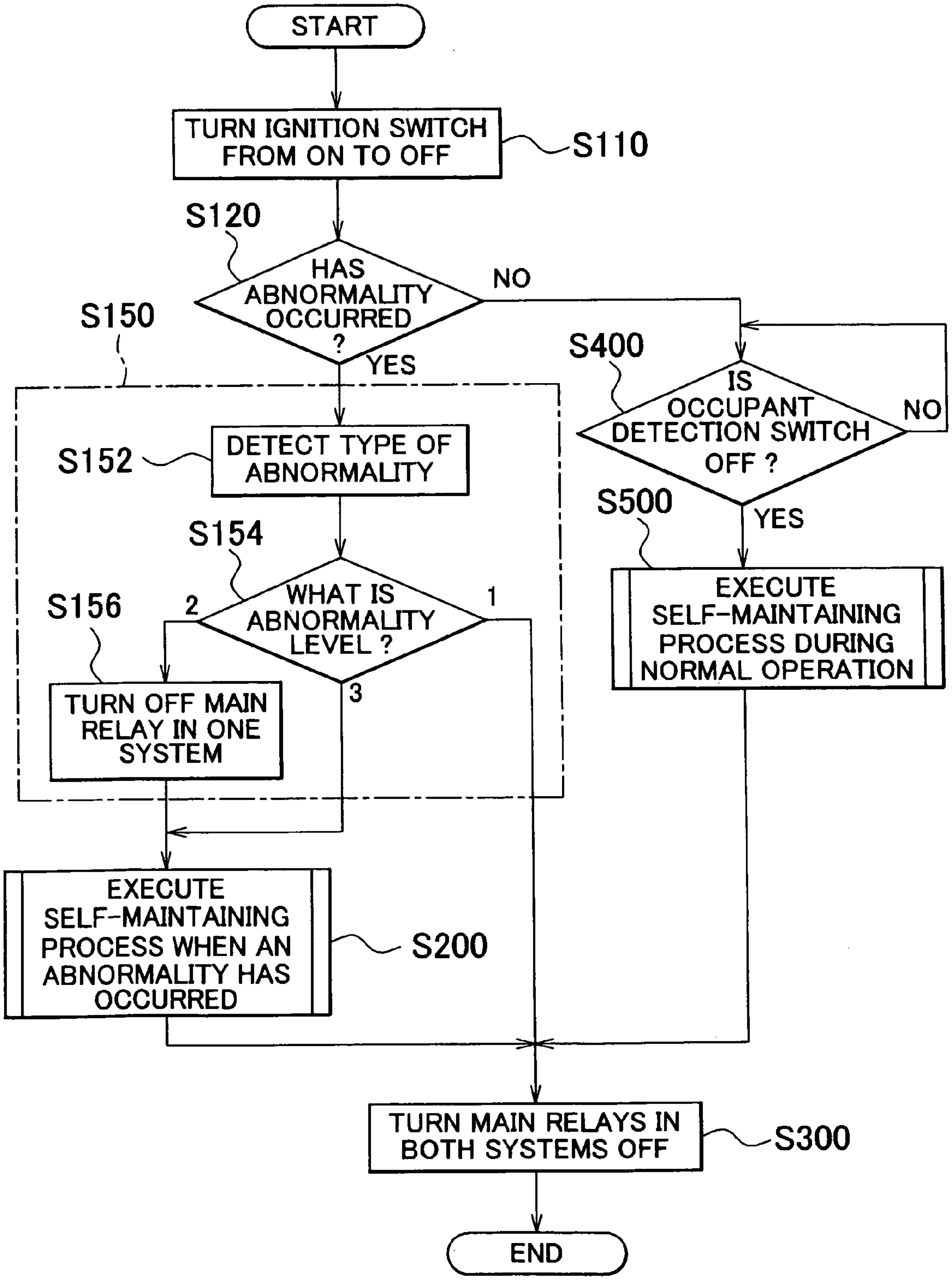
FIG. 6 is a flowchart illustrating a modified example of the control routine shown in FIG. 5, in the power supply control apparatus according to the exemplary embodiment of the invention.

FIG. 6 is a flowchart illustrating a modified example of the control routine shown in FIG. 5. The difference between the control routine in FIG. 6 and the control routine in FIG. 5 is that, in the control routine in FIG. 6, when it is determined in the process in step S120 that an abnormality has occurred (i.e., YES in step 120), the first CPU 290 determines the type of the abnormality and performs other processes according to the determined type of abnormality, as a process in step S150. More specifically, the first CPU 290 evaluates the abnormality level and classifies it into one of three levels (i.e., level 1, 2, or 3) according to the location in which the abnormality has occurred.

FIG. 7 is an abnormality level/location table showing the level of abnormality corresponding to the location of the abnormality, i.e., the type of abnormality. It should be noted that the locations of the abnormalities shown here are only examples; abnormality levels may also be set for other locations where an abnormality may occur. It should also be noted that the abnormality levels as set here are not intended to be limited thereto.

A level 1 abnormality indicates an major abnormality compared to other abnormalities. The locations corresponding to this level of abnormality are the pump motor 78, the four pressure increase valves 150, 152, 154, and 156, and the four pressure decrease valves 160, 162, 164, and 166. When a level 1 abnormality occurs, the first and second ignition switches 270 and 272 are turned off, immediately after which the first and second CPUs 290 and 292 turn off the first and second main relays 240 and 242, respectively.

A level 2 abnormality indicates an relatively moderate abnormality. The abnormality level is set to 2 when an abnormality has occurred in one of the component parts of the control apparatus 296. If the abnormality has occurred in any one of the elements in the first system 200 or second system 202, the first and second CPUs 290 and 292 immediately turns off the main relay corresponding to the system in which the abnormality has occurred, thereby stopping the supply of power to that system. Further, the supply of power to the system to which power is still being supplied is controlled by the self-maintaining process when an abnormality has occurred. If an abnormality occurs in a plurality of locations and there is an abnormality in both of the systems, the abnormality level is set to 1 and both of the first and second main relays 240 and 242 are turned off, thereby stopping the supply of power to both systems. An abnormality in the control apparatus 296 may be detected by the control apparatus 296 itself, or by a separate control apparatus, not shown, that monitors the overall vehicle, for example.

A level 3 abnormality indicates a relatively minor abnormality. In this case, the self-maintaining function during an abnormality activates. The abnormality level is set to 3 when there is an abnormality in any of the various pressure sensors, such as the first and second accumulator pressure sensors 84 and 86, the first and second master cylinder pressure sensors 62 and 64, and the wheel cylinder pressure sensors 40, 42, 44, 46, or the first and second stoke sensors 112 and 114. When a level 3 abnormality occurs, the power supply is controlled according to the self-maintaining process when an abnormality has occurred, without stopping the supply of power because of the abnormality that occurred. This abnormality level/location table is stored in a predetermined storage region in the first CPU 290.

Returning to FIG. 6, the following description will focus on the process that differs from the process in FIG. 5, namely, the process in step S150 when an abnormality has occurred. When it has been determined in the process in step S120 that there is no abnormality (i.e., NO in step S120), the following processes are the same as in FIGS. 4 and 5, so a description thereof will be omitted. When it has been determined that an abnormality has occurred (i.e., YES in step S120), on the other hand, the first CPU 290 determines the type of the abnormality. (step S152). In other words, the first CPU 290 detects the location where the abnormality has occurred. The first CPU 290 then determines the abnormality level according to the detected location where the abnormality occurred based on the abnormality level/location table shown in FIG. 7 (step S154).

If the abnormality level is determined to be level 1 (i.e., 1 in step S154), the abnormality is considered to be relatively major, so the first CPU 290 makes a determination to stop the supply of power to both the first and second systems 200 and 202. The first and second CPUs 290 and 292 then immediately turn off the two systems of the first and second main relays 240 and 242, respectively (step S300).

If the abnormality is determined to be level 2 (i.e., 2 in step S154), the abnormality is considered to be relatively moderate, so the first CPU 290 stops the supply of power to whichever of the first and second systems 200 and 202 the abnormality has occurred in. Accordingly, the first main relay 240 or the second main relay 242, whichever corresponds to the system in which an abnormality has occurred, is turned off (step S156). The self-maintaining process when an abnormality has occurred is executed for the system to which power is still being supplied (step S200).

If the abnormality is determined to be level 3 (i.e., 3 in step S154), the abnormality is considered to be relatively minor, so the first CPU 290 controls the supply of power according to the self-maintaining process when an abnormality has occurred without stopping the supply of power (step S200). The rest of the routine is the same as that in the routine shown in FIG. 5.

According to the routine described above, it is possible to control the supply of power by the self-maintaining process according to the location where the abnormality occurred, i.e., according to the abnormality level, by turning the first and second ignition switches 270 and 272 off when an abnormality has occurred in the electronically controlled brake system.

In the exemplary embodiment, the electronically controlled brake system is given as an example of the actuator, but the invention is not limited to this. The invention may also be widely applied to any apparatus that controls the behavior of the vehicle, such as an electrically driven power steering apparatus or an hydraulic pressure driven power steering apparatus (together also referred to as an electronically controlled power steering system). Also, in this exemplary embodiment, the type of abnormality is set according to the component part of the electronically controlled brake system and the amount of power from supplied from the vehicle battery 230 is controlled according to the location in which the abnormality has occurred, but the invention is not limited to this. For example, the abnormality level may be set for each system, i.e., for each actuator, and the amount of power supplied when the ignition switch is turned from on to off may be controlled according to the system in which the abnormality has occurred.

FIG. 8 shows the correspondence between the abnormality level and the system in which the abnormality occurred. When an abnormality has occurred in an electronically controlled brake system, the abnormality level is 1 and the supply of power to the entire vehicle is immediately stopped when the ignition switch is turned from on to off. When an abnormality has occurred in an electronically controlled power steering system, the abnormality level is 2, the supply of power to the electronically controlled power steering system is stopped and the self maintaining process when an abnormality has occurred is applied for the other systems when the ignition switch is turned from on to off. When an abnormality has occurred in an electronically controlled parking brake system, the abnormality level is 3 and the self-maintaining process when an abnormality has occurred is executed and the supply of power is continued for the predetermined period of time when the ignition switch is turned from on to off.

Thus, an appropriate amount of power can be supplied to the system that requires power because it is possible to appropriately set the system to which the supply of power from the power supply should be stopped when the ignition switch is turned from on to off. That is, operation of the minimum essential systems can be ensured so inconvenience to the user is reduced.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments and processes are shown in various combinations and configurations, which are exemplary, other combinations and configurations, including more, less or only a single element or process, are also within the spirit and scope of the invention.

For example, a lead battery or a nickel hydride battery may be used as the vehicle battery 230 of the above embodiment. Further, a fuel cell may be used as a power supply for a vehicle. However, the power supply is not particularly limited to any one of these as long as it is capable of supplying power. In a vehicle such as a fuel cell vehicle or an electric vehicle, a vehicle starting means may be a switch that is linked to starting the vehicle.

A power from the power supply may be supplied to a system until a predetermined condition is fulfilled instead of for a predetermined period of time. The predetermined condition may be, for example, detection that an occupant is no longer in the vehicle.

When an abnormality is detected in the vehicle, the abnormality detecting means may also change, according to time, the amount of power supplied by the power supply depending on the determined type of abnormality. The controlling means may also reduce the change in the amount of power supplied in proportion to the time elapsed after the vehicle starting means is switched from on to off, and when the amount of power supplied is reduced, the controlling means may also change the rate of change of the amount of power supplied according to the elapsed time. For example, after starting to reduce the amount of power supplied, the controlling means may first gradually reduce the amount of power supplied for a predetermined period of time and then rapidly reduce it for a predetermined period of time. Then, when the amount of power supplied becomes a predetermined value just prior to reaching zero, the controlling means may reduce it gradually again. According to this structure, the amount of power supplied by the power supply can be changed over time to the optimum amount according to the type of abnormality. As a result, it is possible to inhibit the abnormality in the system in which an abnormality has occurred from becoming more severe.

In the above embodiment, the amount of power supplied to the system is changed according to a voltage Vb of the vehicle battery 230, i.e., a battery state-of-charge. However, if the power supply for the vehicle is a fuel cell, the amount of power supplied to the system may be changed according to the amount of remaining fuel.

As described above, the foregoing exemplary embodiments, as well as the modifications thereof, enable the realization of power supply control for supplying power according to the state of the vehicle when vehicle starting means has been turned from on to off.

What is claimed is:

1. A power supply control apparatus comprising:

a power supply which supplies power to at least one system of the vehicle;

a vehicle starting apparatus which is located between the power supply and the at least one of system, and which is switched from one state to another when the vehicle is started up;

an abnormality detecting portion which detects an abnormality in the vehicle; and a controller which controls, based on a detection result from the abnormality detecting portion, an amount of power supplied from the power supply over a preset time interval when the vehicle starting apparatus is switched from on to off, wherein, when the abnormality has been detected in the vehicle, the abnormality detecting portion determines the type of the abnormality, and the controller changes the preset time interval, according to the determined type of the abnormality.

2. The power supply control apparatus according to claim 1, wherein the controller stops the supply of power supplied over the preset time interval from the power supply based on the detection result from the abnormality detecting portion when the vehicle starting apparatus is switched from on to off.

3. The power supply control apparatus according to claim 2, wherein the controller stops the supply of power supplied over the preset time interval from the power supply when the abnormality is detected in the vehicle by the abnormality detecting portion.

4. The control apparatus according to claim 1, wherein when the abnormality has been detected in the vehicle, the abnormality detecting portion determines the type of the abnormality; and the controller changes, according to the preset time interval, the amount of power supplied from the power supply when the vehicle starting apparatus is switched from on to off.

5. The control apparatus according to claim 1, wherein the vehicle has a plurality of systems; the abnormality detecting portion detects whether there is the abnormality in any of the plurality of systems; and when the abnormality is detected in one of the plurality of systems, the controller stops the supply of power to the system in which the abnormality has been detected when the vehicle starting apparatus is turned from on to off.

6. The control apparatus according to claim 1, wherein when the at least one of system of the vehicle comprises a plurality of elements, the abnormality detecting portion detects whether there is the abnormality in any of the plurality of elements; and when the abnormality is detected in one of the plurality of elements, the controller (296) controls the amount of power supplied to the element in which the abnormality has been detected when the vehicle starting apparatus is turned from on to off.

7. The control apparatus according to claim 6, wherein when the abnormality has been detected in the vehicle, the controller reduces the amount of power supplied to the element in which the abnormality was detected so that the amount of power supplied is less than when the abnormality has not been detected.

8. The control apparatus according to claim 1, wherein when the abnormality has been detected in the vehicle, the controller reduces the amount of power supplied to the at least one of system in which the abnormality was detected so that the amount of power supplied is less than when the abnormality has not been detected.

9. The power supply control apparatus according to claim 1, wherein the abnormality detecting portion further detects a power supply capability of the power supply; and the controller reflects the power supply capability in the amount of power supplied from the power supply when the vehicle starting apparatus is turned from on to off.

10. The power supply control apparatus according to claim 9, wherein the controller reduces the amount of power supplied to the at least one of system the lower the power supply capability.

11. A power supply control method comprising:

detecting an abnormality in a vehicle;

determining whether a vehicle starting apparatus, which is switched from one state to another when the vehicle is started up, has switched from on to off;

controlling, based on whether the abnormality has been detected, an amount of power supplied to a system of the vehicle from a power supply over a preset time interval when the vehicle starting apparatus has switched from on to off;

when the abnormality has been detected in the vehicle, determining the type of the abnormality; and changing the preset time interval, according to the determined type of abnormality.

12. The power supply control method according to claim 11, wherein when the abnormality has been detected, the amount of power supplied to the system in which the abnormality was detected is reduced so that the amount of power supplied is less than when the abnormality has not been detected.

13. The power supply control apparatus according to claim 1, wherein the preset time interval is initially set based on a voltage of the power supply.

* * * * *